United States Patent [19]

Hogan

[11] Patent Number: 4,690,307
[45] Date of Patent: Sep. 1, 1987

[54] DISPENSING SYSTEM WITH SLIDABLE MODULES

[75] Inventor: Lawrence R. Hogan, Lake Villa, Ill.

[73] Assignee: Cole-Parmer Instrument Company, Chicago, Ill.

[21] Appl. No.: 579,381

[22] Filed: Feb. 13, 1984

Related U.S. Application Data

[63] Continuation-in-part of Ser. No. 427,504, Sep. 29, 1982, Pat. No. 4,513,885, which is a continuation of Ser. No. 35,817, May 4, 1979, abandoned.

[51] Int. Cl.⁴ ............................................. F04B 43/12
[52] U.S. Cl. .................................... 222/95; 222/105; 222/181; 222/183; 222/214; 222/383
[58] Field of Search ................ 222/95, 105, 131, 135, 222/144.5, 181, 183–185, 214, 207, 209, 383, 380; 312/333, 320

[56] References Cited

U.S. PATENT DOCUMENTS

| | | | |
|---|---|---|---|
| 508,327 | 11/1893 | Lippincott | 222/185 X |
| 2,718,335 | 9/1955 | Shippen | 222/135 |
| 3,881,641 | 5/1975 | Pliml, Jr. et al. | 222/214 X |
| 4,143,795 | 3/1979 | Casebier | 222/185 X |

FOREIGN PATENT DOCUMENTS

| | | | |
|---|---|---|---|
| 526895 | 3/1954 | Belgium | 222/214 |
| 503003 | 5/1954 | Canada | 222/214 |

*Primary Examiner*—Charles A. Marmor
*Attorney, Agent, or Firm*—Fitch, Even, Tabin Flannery

[57] ABSTRACT

A dispensing system includes a support stand adapted to slidably support at least one portable modular dispenser housing in which is mounted a flexible fluid impervious container having a flowable food product contained in sealed relation therein and to which a compressible flow tube is affixed having a discharge fitment thereon facilitating removal of product from the container. A rotor is mounted within the dispenser housing for cooperation with the compressible flow tube to enable controlled portion dispensing of product from the discharge fitment through actuation of an external operating handle.

8 Claims, 4 Drawing Figures

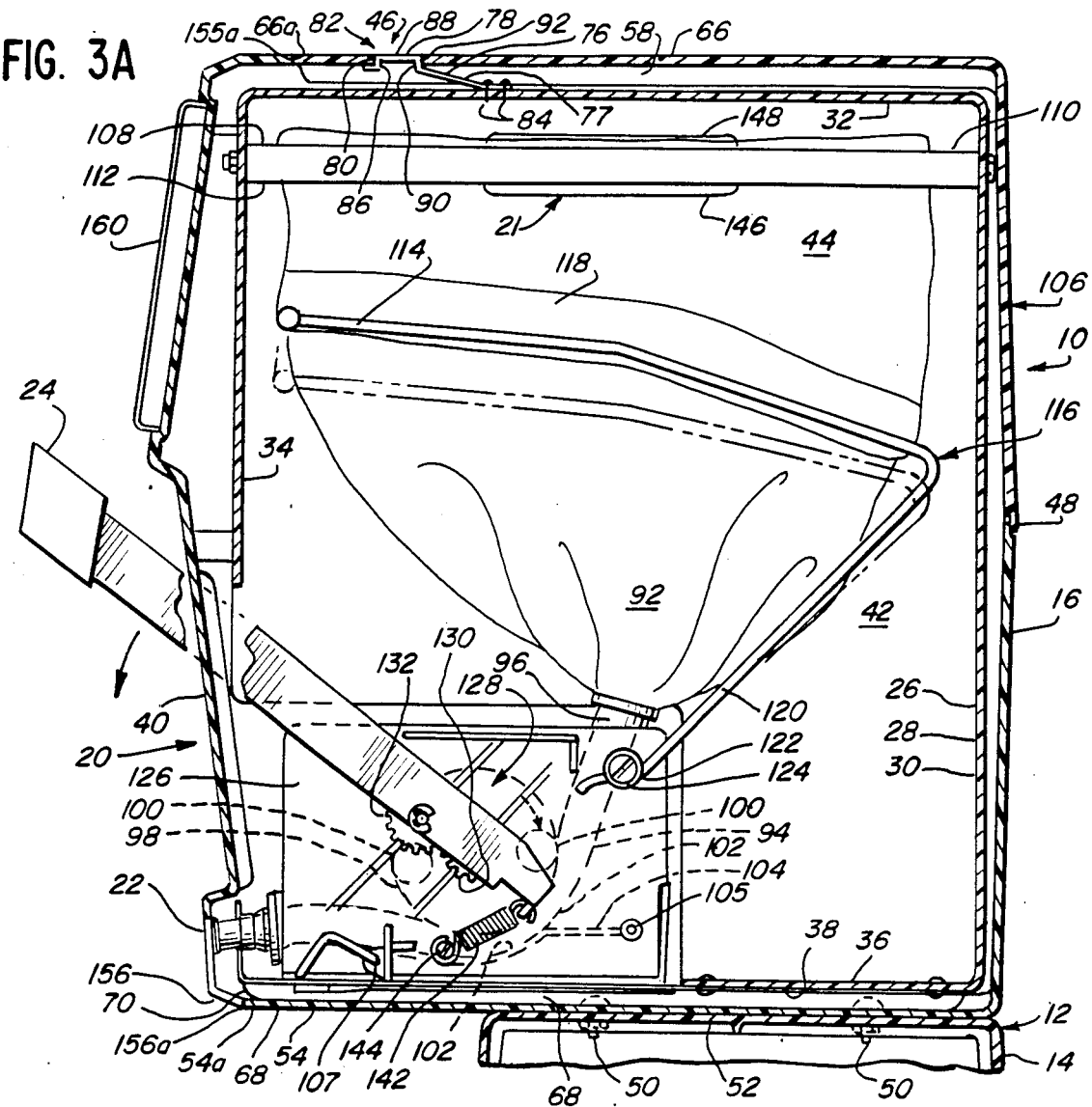

DISPENSING SYSTEM WITH SLIDABLE MODULES

This application is a continuation in part of copending application seriel No. 427,504, filed Sept. 29, 1982, now U.S. Pat. No. 4,513,883, issued Apr. 30, 1985. Application Ser. No. 427,504, is a continuation of patent application Ser. No. 35,817 filed May 4, 1979 now abandoned.

BACKGROUND OF THE INVENTION

The present invention relates generally to dispensing systems, and more specifically to a novel dispensing system particularly adapted for self-service dispensing of selected portions of flowable food products under highly sanitary conditions.

The advent of self-service in many types of eating establishments has created a corresponding need for self-service dispensing apparatus and systems which facilitate self-serving of flowable food products such as condiments, syrups, salad dressings and toppings in a relatively quick and easy manner while maintaining highly sanitized conditions so as to prevent contamination of the food products or other undesirable unsanitary conditions.

Dispensing systems of the type to which the present invention relates also find application in "fast-food" eating establishments where significant volumes of food products such as sandwiches and salads are made in an ongoing manner. In such establishments, it is particularly desirable that employees be capable of dispensing condiments or salad dressing onto the food products in relatively exact portions so as to prevent waste which can have a significant effect on operating costs. Where relatively large volumes of products are dispensed in a day's operation, it is particularly desirable that any dispensing system operable by employees be adapted to receive and dispense from relativel large bulk containers which enable lower cost bulk purchase. In employing bulk containers of food products, however, it is frequently necessary that the product containers be removed from their associated dispensing apparatus or systems during certain periods, such as while the establishment is closed, and stored in a refrigerated area so as to prevent spoilage.

Government regulations covering food service sanitation have also been promulgated which require the maintenance of highly sanitized facilities and conditions in various aspects of food service establishments, including supply, storage, display, serving and cleaning.

Copending U.S. Pat. Application No. 427,504, incorporated herein by reference, illustrates a dispensing system for dispensing flowable food products under highly efficient and sanitized conditions. That dispensing system includes one or more modules removably supported by brackets on a support frame. Each module includes a housing within which is disposed a flexible container of food product. The system of the present invention employs modules having dispensing mechanisms similar to those described in the above-referenced application, but the present invention provides improvements which facilitate installation and removal of the flexible containers, and insertion and removal of the modules.

SUMMARY OF THE INVENTION

In accordance with the present invention, there is provided a modular dispensing system comprising one or more independent dispensing modules slidably supported in a dispensing stand which comprises a base portion and a housing supported thereby. Latch means are preferably provided to enable the modules to be locked in predetermined installed positions in the housing. Each module has a relatively large side opening to provide access to the module interior. To eliminate the need for a movable access panel to cover the opening in each module, the modules and stand are configured so that when the modules are installed position, the openings are covered by the housing.

A general object of the present invention is to provide a novel dispenser system which is particularly adapted for portion dispensing of flowable food products and the like under highly efficient and sanitized conditions.

A more particular object of the present invention is to provide a novel dispensing system which includes a support stand or frame adapted to slidably support one or more modular dispensing units, each of which is individually operable to dispense flowable food products such as condiments and the like, and wherein each dispensing module may be readily removed from the support stand for servicing or transfer to a refrigerated area during periods of nonuse so as to prevent spoilage.

Further objects and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 3A is an elevational sectional view of a dispensing system in accordance with the present invention, showing the dispensing handle in its upper position.

FIG. 3B is a fragmentary sectional elevational view of the apparatus of FIG. 1, showing the dispensing handle in its lower position.

DETAILED DESCRIPTION OF THE PREFERRED EMBODIMENT

Figure 1:
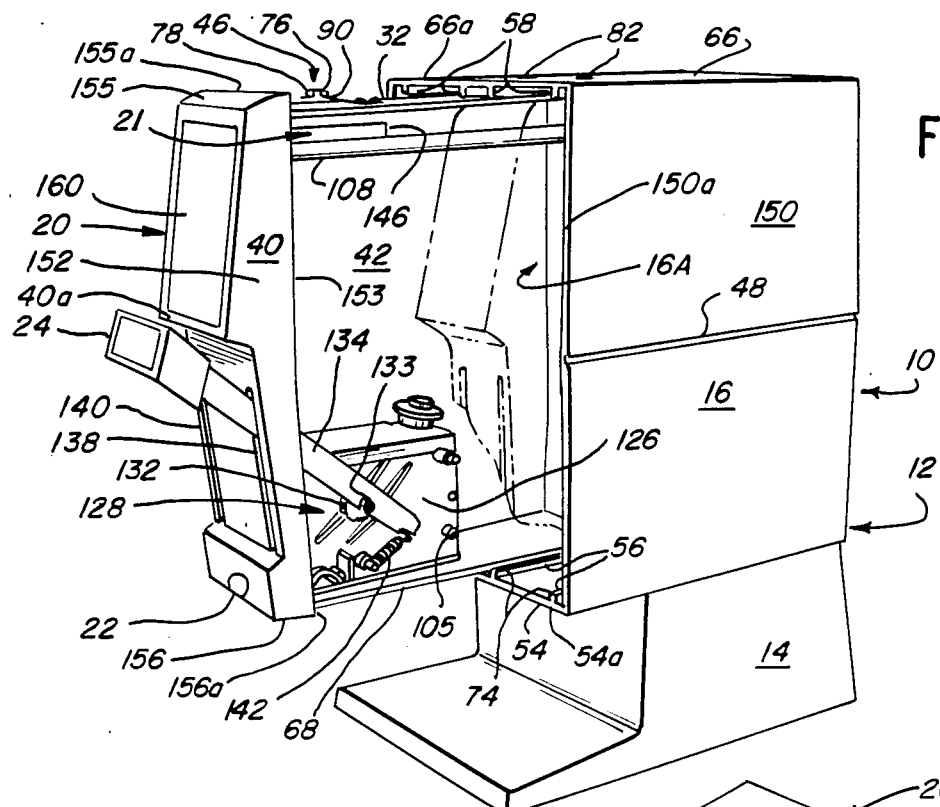
FIG. 1 is a perspective view of a dispensing system in accordance with the present invention, showing one module partially removed and showing in phantom a fragmentary view of a second module.
Figure 2:
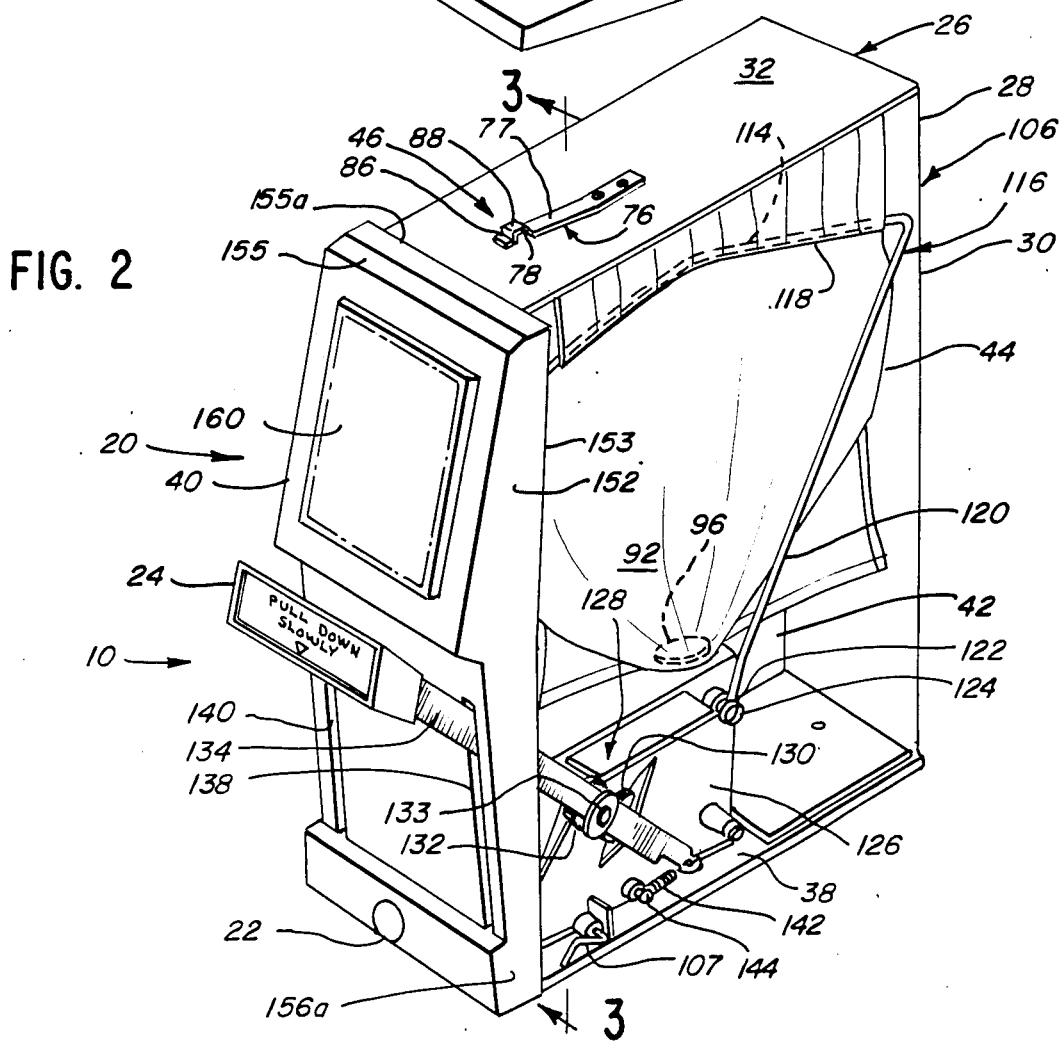
FIG. 2 is a perspective view of a module of the dispensing system of FIG. 1.

Referring now to the drawings, a system for dispensing fluent products constructed in accordance with one embodiment of the present invention is indicated generally at 10. The dispenser system 10 is particularly adapted for dispensing flowable or fluent food products such as condiments, syrups, and toppings, and finds particular application in eating establishments where it is desirable that either employees or customers be able to dispense generally consistent quantity portions of such products onto items such as sandwiches, salads or desserts without waste, and wherein the various components of the system may be serviced in a highly efficient and sanitary manner without undue downtime.

Very generally, the dispensing system 10 includes a support stand or cabinet 12 having a base 14 and a housing 16 which is open at the front. In the illustrated embodiment, the stand 12 is adapted to support two substantially identical dispenser modules 20, each of which is adapted to dispense a fluent food product from a corresponding discharge fitment 22 through the manual operation of an actuating handle 24. As will become more apparent hereinbelow, each actuating handle 24 is biased toward an upper position, as shown in FIG. 3A, and is manually movable to lower position, as shown in FIG. 3B, during which a discrete portion of fluent food product may be discharged onto a salad, sandwhich, or other item held or placed below the discharge fitment 22 while the corresponding actuating handle 24 is operated.

The dispenser module 20 is representative of the dispenser modules which may be mounted on the support stand. As best illustrated in FIG. 3A, the dispenser module 20 includes a substantially rectangular frame, indicated generally at 26. The frame 26 herein includes a single structural member 28 which forms a back wall 30 and top wall 32 for the module and has a front portion 34 extending downwardly from the forward end of the front wall and a bottom portion 36 extending forwardly from the lower end of the rear wall 30. A bottom wall 38 and a front section 40 are attached to the front portion 34 and bottom portion 36 respectively. A single side wall 42 is disposed on one side of the module 20 contiguous with the structural member 28. To enable loading and unloading of a food container 44 and servicing of various internal components of the module 20, the opposite side of the module 20 is open.

The dispenser modules 20 are adapted for releasable mounting on the support stand 12 so that they may be readily removed therefrom for servicing or for movement to a refrigerated storage, or re-filling area during periods of nonuse.

Copending Application Ser. No 427,504 discloses a dispensing system wherein modules are releasably attached to a support frame by support brackets. The sides of the modules are partially exposed when the modules are on the support frame, and each module has a removable side panel so that the interior of the module may be enclosed during use, but may be accessed by removable of the panel for changing food containers, servicing, etc.

In accordance with the present invention, each of the modules 20 herein is slidably supported in the support stand 12. The slidable support facilitates removal and installation of the modules 20. When in installed position, each module 20 has its top, bottom, sides, and back enclosed by the upper portion of the stand housing 16, leaving only the front portions exposed. Lifting of the module 20 is facilitated by handle means 21. To prevent accidental displacement of a module 20, and to guard against tampering in self-service application, the system 10 preferably includes latch means 46 which releasably lock each module 20 in installed position. To enable the system to be durable, scratch-resistant, lightweight, and relatively economical to manufacture, the stand 12 is preferably of molded plastic construction.

Turning now to a more detailed description of the preferred embodiment of the present invention, the housing 16 is made of two pieces of molded plastic joined together at a horizontal seam 48. The base 14 is of one-piece molded plastic construction. To facilitate assembly of the stand, the base 14 herein is attached to the housing 16 by fasteners 50 such as the illustrated bolts which extend through the top wall 52 of the base 14 and the bottom wall 54 of the housing, and which are readily accessible through the bottom of the base 14 and the front of the housing 16.

To guide the modules 20 as they are moved within the housing 16, longitudinal guide surfaces or ribs 56 are integrally molded with the interior of the bottom wall 54 of the housing 16 to cooperate with runners 68 on the modules 20. The ribs 56 are preferably arranged in pairs, with each pair being associated with a particular module 20.

The runners 68 have rounded ends 70 to enable them to slide smoothly along the bottom wall 54. Each pair of ribs 56 preferably extends longitudinally between the runners 68 of an associated module 20, and the inside surfaces (not shown) of the runners 68 are smooth and substantially planar so as to slide along the outer surfaces of the ribs 56.

In addition to guiding the modules, the ribs 56 add strength and rigidity to the bottom wall 54. To strengthen and stiffen the top wall 66, ribs 58 are formed thereon.

To latch the modules 20 in installed position, the latch means 46 on each module 20 automatically snaps into locking position when the module reaches installed position. The preferred latch means 46 comprises a resilient latch 76 secured to the top wall 32 of the module 20 at one end and having a raised projection 78 near its opposite end to lock against a rearwardly facing transverse latch-engaging surface 80 (FIG. 3A) on the top wall 66 of the housing 16. During insertion of the module 20 into the housing 16, the front edge of housing top wall 66 will engage the inclined surface 77 on the latch 76 and cam the latch down to slide under the top wall. As a module 20 is slid into place, the raised projection 78 of the latch 76 reaches the transverse surface 80 and the resilience of the latch 76 pushes the projection 78 upward to engage the transverse surface 80.

To facilitate visual or tactile determination of whether the latch 76 is in its latched position, and to enable the latch 76 to be released manually with little effort, an opening 82 in the top wall 66 of the housing 16 provides the latch-engaging surface 80. The projection on the latch is dimensioned so as to extend into the opening 82 without projecting thereabove. This enables the latch 76 to be released simply by applying downward pressure thereto with a finger, yet allows objects to be placed atop the housing 16 without releasing the latch 76.

Herein, the latch 76 is formed from a strip of metal such as spring steel or the like, and is secured by rivets 84 or other suitable means on the top wall 32 of the module 20. The preferred latch 76 extends forwardly from the fasteners 84 and lightly upward. The projection 78 is defined by three bends which define a short vertical portion 86 at the forward end of the latch 76 for bearing against the transverse surface 80, a horizontal portion 88 which is visible through the opening 82 when in locked position, and a second vertical portion 90 which limits rearward movement of the module 20 by engagement with a second transverse surface 92 at the opening 82.

Each dispener module 20 is adapted to support a flexible fluid impervious container 44 within the dispenser housing 16 so that each downward stroke of the operating handle 24 effects discharge of a predetermined portion of food product from the discharge fitment 22. The container 44 may be made of a pair of identical size sheets of flexible liquid impervious material, such as a suitable polyethylene material, which are generally rectangular in plan configuration and which are secured, as by heat sealing, along their marginal edges to form a sealed fluid-tight container. Preferably, the sheets of liquid impervious material forming the container 44 are also heat sealed along downwardly inclined and converging seal lines to establish a generally conically shaped lower end 92 of the container to which the fluent food product gravitates when the container 44 is installed within a dispensing module 20.

A compressible tubular discharge tube 94 is connected at one end to the container 44 adjacent the center of the lower end 92 thereof so as to communicate with the interior of the container. The discharge tube 94 may be connected in sealed relation to one of the sheets of fluid impervious material forming the container, through a suitable coupling or connector 96 of known design, and has a discharge fitment 22 secured to its opposite end in fluid-tight relation therewith, as will be described. The opening in the container 44 which has communication with connecter 96 serves as the opening through which food product is introudced into the container 44.

Food product is discharged from the container 44 by a peristaltic pumping action effected by a rotor 98 which is mounted on a horizontal shaft 99 which is rotatably supported at its opposite ends by a pair of vertical walls, one of which is shown at 126.

As the rotor 98 rotates, product is forced through the discharge tube 94 by a plurality of rotatably mounted cylindrical rollers 100 disposed generally parallel to the shaft 99. The rollers 100 compress the tube 94 against a cam surface 102 on a cam plate 104 which is pivotal about a hinge 105 between an open or lowered position permitting installation of the discharge tube and a closed position for operation. To maintain the cam plate 104 in closed position, lock means 107 are provided. The rotor 98 is adapted for driving rotation with the drive shaft through unidirectional clutch means (not shown) which may take the form of a Spraque-type clutch interdisposed between the drive shaft and the rotor 98.

To insure substantially complete discharge of fluent food product from the container 44, means 106 are provided to continually maintain the air space or head within the contain slightly pressurized. To accomplish this, when mounting a filled food container 44 in the module 20, the free end of the container 44 is passed over a horizontally disposed rotatable hanger bar 108 having a rearward end 110 secured to the rear wall 30 near its upper end and having a forward end 112 suitable secured to the front panel 40 so that the hanger bar 108 is spaced below the top wall 32 to enable threading of the flexible container over the hanger bar 108. After passing the upper end of the container 44 over the hanger bar 108, an elongated arm portion 114 of a spring 116 is inserted through the transverse sleeve 118 formed at the free end of the container 44. A downwardly inclined arm portion 120 of the spring arm is formed with a lower hook end 122 which is pulled downwardly and hooked about a retaining pin 124 fixed on an upstanding support wall 126. When the upper end of the loaded container 44 is passed over the hanger bar 108 and the arm portion 114 of the spring 116 is inserted through the passage, a slight bending or distortion of the downwardly inclined portion 120 relative to the arm portion 114 is required in order to hook the end 122 about the retaining pin 124. This action serves to put tension on the container bag 44 so as to pressurize the air space within the container 44 and removes wrinkles which trap the food product during evacuation. During emptying or discharge of food product from the container 44, the spring 116 continues to progressively draw the free end of the container 44 over the hanger bar 108 so as to maintain pressure within the container and removes wrinkles which trap the food product during evacuation.

To enable a predetermined quantity of food product to be released by a stroke of the operating handle 24, gear means 128 are provided to mechanically interconnect the handle with the rotor 98. Also, the gear means is necessary to impart the correct direction of rotor rotation for a downward stroke of handle 24, also, it increases a 45° handle storke to a 90° rotor rotation. Herein, a driven spur gear 130 is fixed on an outer end of the rotor shaft 99 outwardly of the support plate 126 and is cooperable with and rotated by a drive spur gear 132 rotatable on a stub shaft 133.

The operating handle 24 is U-shaped and has arm portions 134 extending inwardly through elongated slots 138 and 140 formed in the front section 40. One arm portion 134 is fixed to the stub shaft 133 to rotate it as the handle 24 is moved. The other arm portion 136 is pivotal about a boss (not shown) aligned with the stub shaft. A coil tension spring 142 is connected at one of its hooked ends to the innermost end of the arm portion 134 and has its opposite end connected to a retaining pin 144 fixed on the support wall 126 so as to bias the operating handle 24 toward its upward position.

As noted above, handle means 21 are provided facilited lifting of the module. Herein, the handle means comprises a generally rectangular opening 146 formed near the top of the sidewall 42 of the module. The opening 146 is dimensioned to provide sufficient space for a person to insert four fingers of one hand so that the weight of the module is transmitted to the hand by the upper edge 148 of the opening.

As best seen in FIG. 1, the housing 16 is provided with an open front face 16a into which may be slid a pair of modules 20. There could, of course, be more modules than two, with the open face 16a being defined by an edge 54a of the bottom wall 54 and edge 66a of the top wall and vertical edges 150a of vertical side walls 150 of the housing 16.

This front face 16a of the housing 16 is closed by the respective adjacent parallel front sections 40 of the respective modules. Each of the module front sections 40 is formed with a front panel or face 40a and a pair of integral vertical side walls 152 which extend rearwardly from front face 40a. The vertical edges 153 of the outer ones of the side walls 152 of the front sections 40 mated with the edges 150a of the housing side walls 150 when the latch means 76 has latched the modules in the fully inserted position of FIG. 3a. Likewise, an edge 155a of a top wall 155 of the front section 40 is aligned to mate and abut against edge 66a of the top wall 66 when the module is fully inserted. The front section 40 also includes a bottom integral wall 156 having a rearward edge 156a in alignment with the bottom wall 54 of the housing to abut the edge 54a as shown in FIG. 3. Thus, it will be seen that the front sections of the modules will cover the open front face 16a and by being disposed adjacent each other and aligned with the respective housing walls effectively close to the entire face 16a of the housing. The front sections preferably carry removable display panels 160 which has advertising and pictorial material correlated with the internal product. Preferably the entire front section 40 is made of integral molded plastic and the front panel 160 is removably mounted in the front section 40.

From the foregoing, it will be appreciated that the present invention provides a modular dispensing system wherein the modules 20 may be readily removed from the stand 12 and moved to a service or staging area for cleaning, loading or other servicing or, alternatively, to a refrigerated storage area during non-use. The slidable support of the modules 20 facilitates removal of modules from the stand 12 and replacement thereof, and enables changing of the containers 44 without removal of the modules.

While a preferred embodiment of the present invention has been illustrated and described, it will be understood that changes and modifications may be made therein without departing from the invention in its broader aspects. Various features of the invention are defined in the following claims.

What is claimed is:

1. A dispenser system for a plurality of flowable products, said system comprising:
    a housing having an upper body having side walls, a top wall and a bottom wall defining a hollow compartment with an open front face,
    a plurality of dispenser modules for sliding rearwardly through the open front face of the module,
    each of the modules having an internal flexible bag of flowable product and peristaltic pump therein for discharging flowable product at a lower front end of the module,
    an open side on each of said modules providing access for installation and replacement of a flexible bag within the module,
    operating means on the front of each module to operate the peristaltic pump to dispense a portion of the flowable product,
    guide surfaces on the modules and housing to guide each of the modules for rearward sliding movement into positions parallel with each other within the housing,
    latching means extending between each of the modules and the housing to latch each module in position in the housing, and
    a front section having a front wall on each module, said front section having a top wall and a pair of sidewalls extending rearwardly from the front wall and joined thereto, the outer wide walls on said modules being aligned with the side walls on the housing and top walls on said modules being aligned with the top wall on the housing.

2. A system in accordance with claim 1 in which said housing side walls, top wall and back wall are formed of molded plastic.

3. A system in accordance with claim 1 in which said guide surfaces include guide ribs on said modules and one of said housing walls for sliding engagement with each other.

4. A system in accordance with claim 1 in which the latch means comprises a latch on each module operable through an opening in the top wall of the housing.

5. A dispensing system comprising, in combination:
    a housing having a body with an open front face,
    at least one dispenser module having a plurality of walls defining an interior chamber for sliding into the housing through the open front face of the housing,
    a flexible fluid impervious container adapted to contain flowable product in substantially sealed relation therin, the container having an outlet openin through which the product may be removed from the container,
    means cooperable with the container and the dispenser module to releasably support the container within the interior chamber defined by the walls of the module so that the product is urged toward the outlet opening under the influence of gravity,
    a compressible discharge tube affixed to the container adjacent the outlet opening and having flow communication with the product within the container,
    a discharge fitment mounted on an end of the discharge tube opposite the container and having a discharge orifice in flow communication with the discharge tube, the fitment being adapted for releasable cooperation with the module so as to maintain the discharge fitment in predetermined relation to the module,
    a rotor rotatably supported within the module for cooperation with the discharge tube from the container upon selective rotation of the rotor,
    an actuating handle cooperable with the rotor and operable to rotate the rotor so as to effect substantially predetermined quantity discharge from the container upon each actuating stroke of the handle, and
    said housing including a base for supporting said housing,
    the housing and module having mutually cooperable means to enable slidable support of the module by the housing, each module being independently removable from the housing,
    each dispenser module having a relatively large side opening to facilitate insertion and removal of the container, each module having a front portion upon which the fitment is mounted and through which the handle extends, and wherein the housing includes means to partially enclose the modules so that when the modules are in installed position, only the front portion of each module is accessible.

6. A dispensing system comprising, in combination:
    a housing having a body with an open front face,
    at least one dispenser module having a plurality of walls defining an interior chamber for sliding into the housing through the open front of the housing,
    a flexible fluid impervious container adapted to contain flowable product in substantially sealed relation therein, the container having an outlet opening through which the product may be removed from the container,
    means cooperable with the container and the dispenser module to releasably support the container with the interior chamber defined by the walls of the module so that the product is urged toward the outlet opening under the influence of gravity,
    a compressible discharge tube affixed to the container adjacent the outlet opening and having flow communication with the product with the container,
    a discharge fitment mounted on an end of the discharge tube opposite the container and having a discharge orifice in flow communication with the discharge tube, the fitment being adapted for releaseable cooperation with the module so as to maintain the discharge fitment in predetermined relation to the module, a rotor rotatably supported within the module for cooperation with the discharge tube from the container upon selective rotation of the rotor, an actuating handle cooperable with the rotor and operable to rotate the rotor so as effect substantially predetermined quantity discharge from the container upon each actuating stroke of the handle, and said housing including a base for supporting said housing, the housing and the module having mutually cooperable means to enable slidable support of the module by the housing, each module being independently removable from the housing, the upper section including opposite side walls extending generally parallel to one another, opposite upper and lower walls extending generally parallel to one another, contiguous with the side walls, and a generally rectangular back wall contiguous with the uppwer, lower and side walls, the walls defining an enclosure which is open at the front, said upper and lower walls each having inner surfaces with elongated ribs formed on them extending generally parallel to the side walls for guiding the modules in sliding movement.

7. A dispensing system comprising, in combination:

a housing having a body with an open front face, at least one dispenser module having a plurality of walls defining an interior chamber for sliding into the housing through the open front face of the housing, a flexible fluid impervious container adapted to contain flowable product in substantially sealed relation therein, the container having an outlet opening through which the product may be removed from the container, means cooperable with the container and the dispenser module to releasably support the container within the interior chamber defined by the walls of the module so that the product is urged toward the outlet opening under the influence of gravity, a compressible discharge tube affixed to the container adjacent the outlet opening and having flow communication with the product within the container, a discharge fitment mounted on an end of the discharge tube opposite the container and having a discharge orifice in flow communication with the discharge tube, the fitment being adapted for releasable cooperation with the module so as to maintain the discharge fitment in predetermined relation to the module, a rotor rotatably supported within the module for cooperation with the discharge tube from the container upon selective rotation of the rotor, an acutating handle cooperable with the rotor and operable to rotate the rotor so as to effect substantially predetermined quantity discharge from the container upon each actuating stroke of the handle, and said housing including a base for supporting said housing, the housing and the module having mutually cooperable means to enable slidable support of the module by the housing, each module being independently removable from the housing, latch means to releasably lock each module in installed position, said latch means comprising a resilient latch member attached to each module and movable between a locked position and an unlocked position, and said housing having one or more openings formed in it, one operatively associated with each latch member, positioned to cooperate with the respective latch members so that as each module is placed in installed position, a portion of the latch means enters the associated opening to lock the module in installed position.

8. A dispensing system comprising, in combination:

a housing having a body with an open front face, a plurality dispenser modules each having a plurality of walls defining an interior chamber for sliding into the housing through the open front face of the housing, a flexible fluid impervious container adapted to contain flowable product in substantially sealed relation therein, the container having an outlet opening through which the product may be removed from the container, means cooperable with the container and in each dispenser module to releasably support the container within the interior chamber defined by the walls of the module so that the product is urged toward the outlet opening under the influence of gravity, a compressible discharge tube affixed to the container adjacent the outlet opening and having flow communication with the product within the container, a discharge fitment mounted on an end of the discharge tube opposite the container and having a discharge orifice in flow communication with the discharge tube, the fitment being adapted for releasable cooperation with the module so as to maintain the discharge fitment in predetermined relation to the module, a rotor rotatably supported within the module for cooperation with the discharge tube from the container upon selective rotation of the rotor, an actuating handle cooperable with the rotor and operable to rotate the rotor so as to effect substantially predetermined quantity discharge from the container upon each actuating stroke of the handle, said housing including a base for supporting said housing, the housing and the module having mutually cooperable means to enable slidable support of the module by the housing, each dispenser module having a relatively large lateral side opening to facilitate insertion and removal of the container through the side opening when the module is removed from said housing, each module having a front face cooperable with a face of an adjacent module to close said open front face of said housing.

* * * * *

UNITED STATES PATENT AND TRADEMARK OFFICE
CERTIFICATE OF CORRECTION

PATENT NO. : 4,690,307
DATED : September 1, 1987
INVENTOR(S) : Lawrence R. Hogan It is certified that error appears in the above-identified patent and that said Letters Patent is hereby corrected as shown below:

Column 1, Line 6, Change "seriel" to --Serial--.

Column 1, Line 41, Change "relativel" to --relatively--.

Column 2, Line 14, After "are" insert --in--.

Column 3, Line 9, After "to" insert --a--.

Column 3, Line 11, Change "sandwhich" to --sandwich--.

Column 3, Line 37, Change "Ser. No." to --Serial No.--.

Column 3, Line 44, Change "removable" to --removal--.

Column 4, Line 51, Change "on" to --to--.

Column 4, Line 53, Change "lightly" to --slightly--.

Column 5, Line 22, Change "introudced" to --introduced--.

Column 5, Line 46, Change "contain" to --container--.

Column 5, Line 51-52, Change "suitable" to --suitably--.

Column 6, Line 16, Change "storke" to --stroke--.

Column 6, Line 32-33, Change "facilitated" to --to faciliate--.

Column 6, Line 54, Change "mated" to --mate--.

UNITED STATES PATENT AND TRADEMARK OFFICE
CERTIFICATE OF CORRECTION

PATENT NO. : 4,690,307

DATED : September 1, 1987

INVENTOR(S) : Lawrence R. Hogan

It is certified that error appears in the above-identified patent and that said Letters Patent is hereby corrected as shown below:

Column 7, Line 49, Change "wide" to --side--.

Column 8, Line 3, Change "openin" to --opening--.

Column 8, Line 32, After "and" insert --the--.

Column 8, Line 48, After "front" insert --face--.

Column 8, Line 56, Change "with" to --within--.

Column 8, Line 61, Change "with" to --within--.

Column 9, Line 20, Change "uppwer" to --upper--.

Signed and Sealed this

Twenty-ninth Day of March, 1988

Attest:

DONALD J. QUIGG

Attesting Officer

Commissioner of Patents and Trademarks